(12) United States Patent
Selby

(10) Patent No.: US 7,533,032 B1
(45) Date of Patent: May 12, 2009

(54) METHOD AND SYSTEM FOR PREDICTION OF MATERIALIZATION OF A GROUP RESERVATION

(75) Inventor: David A. Selby, North Boarhunt Near Fareham (GB)

(73) Assignee: International Business Machines Corporation, Armonk, NY (US)

(*) Notice: Subject to any disclaimer, the term of this patent is extended or adjusted under 35 U.S.C. 154(b) by 1649 days.

(21) Appl. No.: 09/628,398

(22) Filed: Aug. 1, 2000

(51) Int. Cl.
*G06Q 10/00* (2006.01)

(52) U.S. Cl. ......................................................... 705/5

(58) Field of Classification Search ................. 705/5–6, 705/7–8, 22, 28
See application file for complete search history.

(56) References Cited

U.S. PATENT DOCUMENTS

| | | | | |
|---|---|---|---|---|
| 4,775,936 A * | 10/1988 | Jung | ............................... | 705/5 |
| 4,992,439 A * | 2/1991 | Meanwell | ................... | 514/247 |
| 5,191,523 A * | 3/1993 | Whitesage | ...................... | 705/6 |
| 5,237,499 A * | 8/1993 | Garback | ......................... | 705/5 |
| 5,255,184 A | 10/1993 | Hornick et al. | ................ | 705/6 |
| 5,270,921 A | 12/1993 | Hornick | .......................... | 705/6 |
| 5,422,809 A * | 6/1995 | Griffin et al. | .................... | 705/5 |
| 5,648,900 A * | 7/1997 | Bowen et al. | ................... | 705/5 |
| 5,652,867 A | 7/1997 | Barlow et al. | ................... | 703/6 |
| 5,832,454 A | 11/1998 | Jafri et al. | ........................ | 705/6 |
| 5,918,209 A | 6/1999 | Campbell et al. | ............... | 705/5 |
| 6,041,305 A * | 3/2000 | Sakurai | ........................... | 703/6 |
| 6,085,164 A * | 7/2000 | Smith et al. | ..................... | 705/5 |
| 6,298,348 B1 * | 10/2001 | Eldering | ....................... | 707/10 |
| 6,477,503 B1 * | 11/2002 | Mankes | .......................... | 705/5 |

OTHER PUBLICATIONS

L. R. Weatherford & S. E. Bodily, A Taxonomy and Research Overview of Perishable-Asset Revenue Management: Yield Management, Overbooking, and Pricing, 40 Operations Research 5, pp. 831-844 (1992).

* cited by examiner

*Primary Examiner*—C Luke Gilligan
*Assistant Examiner*—Amber L Altschul
(74) *Attorney, Agent, or Firm*—Saul Ewing LLP; John R. Pivnichny (57) ABSTRACT

A system and method for predicting the likelihood of materialization of pending group reservations for the purchase of perishable commodities is disclosed. Details pertaining to perishable commodities for which group reservations for purchase have been made in the past are gathered and analyzed, as are details pertaining to perishable commodities for which group reservations for purchase are currently pending. Based upon the analysis, the likelihood that a particular pending reservation will actually be purchased or "materialize" is determined and utilized for yield management.

26 Claims, 4 Drawing Sheets

METHOD AND SYSTEM FOR PREDICTION OF MATERIALIZATION OF A GROUP RESERVATION

BACKGROUND OF THE INVENTION

1. Field of the Invention

This invention relates generally to purchasing and reservation systems and, in particular, the present invention relates to improvement of yield management with respect to the group reservation of perishable commodities such as airline seats, hotel rooms and the like.

2. Description of the Related Art

Common carriers such as commercial buses, trains, and airlines, and service industries such as hotels and rental car companies, face complex issues when conducting strategic and operational planning. Each of these types of organizations deal with "perishable commodities" which are defined as commodities that cannot be inventoried and share three common characteristics: perishability, "fixed" capacity, and segmentability. Perishability means that each commodity ages or becomes unavailable, and thus has no value, after a certain date, time or similar temporal event (referred to herein as the "perishing date"). "Fixed" capacity implies a high cost of adding an incremental unit such that capacity is regarded as static and unchanging. Segmentability refers to the ability to segment customers based on a willingness to pay using different rates and/or different purchase restrictions, such as the date of purchase relative to the perishing date. Examples of perishable resources include airline seats, hotel room nights, rental car days and similar products or services such as described in L. R. Weatherford & S. E. Bodily, A Taxonomy and Research Overview of Perishable-Asset Revenue Management: Yield Management, Overbooking, and Pricing, 40 Operations Research 5, pp. 831-44 (1992), the disclosure of which is incorporated herein by reference.

Organizations marketing and selling perishable commodities spend numerous hours trying to choreograph the interrelated elements of scheduling, routing, and crew/staff rotations while maximizing profits and efficiency. Maximum profits are achieved when all of the available perishable commodities (e.g., with respect to airlines, all seats on a given flight) are sold on the perishing date (e.g., with respect to airlines, at the time the given flight departs). Maximum customer satisfaction occurs when perishable commodities reserved by consumers are available on the perishing date. The marketer/seller of perishable commodities must therefore constantly balance these two competing interests so that all of the commodities are sold and are available for all those who reserved them.

The terms "revenue management" and "yield management" are now common terms in service industry parlance to describe the use of statistical analysis to manage itinerary control, inventory control, over-booking and pricing so as to increase the revenue yield per unit of available capacity. Based on the statistical analysis, forecasting, optimization models, and the like, determinations are made as to which reservation requests to accept and which to reject in order to maximize revenues.

The airline industry presents a typical example of a service industry which utilizes yield management techniques to try to maximize profits while coping with the complicated operational issues inherent to the industry. It is a well-known practice in the airline industry to overbook flights in an attempt to assure that the flights are fully loaded with passengers on the perishing date, thereby maximizing the profits for the airlines. The policy of overbooking is based upon practical considerations. For various reasons, not all flights reserved are actually purchased, i.e., while they may have been reserved, they do not actually "materialize".

One such reason relates to group bookings of "blocks" of seats in connection with, for example, a tour group or a large organization. Typically such reservations are made by a group coordinator 10-12 months in advance of the actual flight date. This means that the group coordinator must estimate the number of seats which will be needed for the block, and to assure that there are enough seats available for all those wishing to travel with the group, it is typical for the group coordinator to overestimate rather than underestimate the number of seats needed.

While providing convenience for the group coordinator, such reservation practices make it particularly difficult for airlines to assure that all flights depart without empty seats. For example, if the group coordinator waits until the last minute to inform the air carrier that less seats will be needed than were originally reserved, these unsold seats are considered unmaterialized reservations and the air carrier is suddenly left with seats which it may not be able to sell by the perishing date, resulting in a less-than-full flight. To compensate for unmaterialized reservations, airlines have adopted the policy of overbooking flights, particularly when the reservations are made by group coordinators who have a history of making group bookings having a low "materialization level," i.e., having a high level of unmaterialized reservations. This practice is based on the understanding that a certain percentage of the seats on "reserved" status by the group coordinator will never actually materialize.

In a perfect world, the airlines could always tell with precision precisely how many seats a group coordinator would over-reserve for a particular flight and would then overbook for that flight by the exact number so that all seats would be filled. In reality, however, it is impossible to predict precisely how may reservations will not materialize; thus, airlines end up with either too few seats sold, thereby losing revenues by flying aircraft with empty seats, or too many seats sold, requiring the airlines to "bump" passengers onto the next available flight to their destination. While most airlines will in some manner compensate passengers that have been bumped, for example, by providing them with vouchers good towards future flights on the airline, free hotel accommodations, and the like, such a practice, is costly for the airlines, is usually extremely inconvenient to the airline traveler, and can lead to once-loyal passengers migrating to a competitor airline.

In an attempt to overcome the above problems, airlines may track the historical accuracy with which a particular group coordinator makes group reservations over a period of time. Based on the historical materialization level of the group coordinator as determined by these tracking methods, the point at which the particular flight(s) being reserved by the group coordinator is/are considered "closed" to additional bookings is increased to a number greater than 100% of the capacity of the aircraft, with the exact percentage greater than 100% being based upon the track record for that group coordinator.

The above-described tracking methods involve straight statistical analysis of the group coordinator's historical performance over a period of time. While the use of such methods provides assistance to the airlines, their focus is always on very general statistical history of a specific group coordinator and not on the factors that may cause a particular group reservation to be more accurate or less accurate. For example, many factors may cause a particular group booking to be more or less likely to fully materialize, including the country or countries involved in the booking; the number of seats being booked as a group; the complexity of the booking (e.g., does it also involve coordination with hotel stays and ground transportation as a "package deal"); and, with respect to itineraries involving multiple flight segments or flight "legs," the number of different air carriers used in the itinerary. None of the prior art methods, however, analyze these or other similar details to allow a particular group reservation and/or group coordinator to be characterized as possessing certain traits which might identify reasons why a particular group reservation having certain characteristics is more likely to have a high materialization level than another, or to identify a particular group coordinator as possessing the ability to book one type of group booking with greater accuracy than another, different type of group booking.

The Applicant has determined, however, that it is only by understanding why a particular group booking has a high materialization level that better prediction models can be developed so as to optimize the yield management or revenue management system. If characteristics of the group coordinator making the reservations and/or the group booking itself were to be factored into the analysis, the effectiveness of the overbooking policy by the airlines could be increased. However, none of the prior art systems attempt to make such an analysis.

Accordingly, it would be desirable to have a method and system for gathering and storing information about prior reservations attributed to group bookings, details of the a current group reservation, and characteristics related to the group coordinator making the group reservation, and using this information to determine, with more precision than is available in the prior art, the materialization level of a pending current group reservation.

SUMMARY OF THE INVENTION

It is therefore an object of the invention to provide a system and method for predicting the likelihood of materialization of pending reservations reserved as part of a group booking, which system and method provides for the gathering and storing of information about prior reservations attributed to group bookings, details of the a current group reservation, and characteristics related to the group coordinator making the group reservation, and using this information to determine, with more precision than is available in the prior art, the materialization level of a pending current group reservation.

In a first embodiment, the present invention comprises a method for materialization forecasting with respect to group reservations made by a group coordinator for the potential purchase of perishable commodities, comprising the steps of: gathering past reservation information relating to past group reservations for perishable commodities that have already perished; gathering current reservation information relating to a current group reservation for perishable commodities that have not yet perished; comparing the past reservation information and the current reservation information; calculating the materialization level of the current group reservation based on the comparison; and outputting a materialization forecast result for the current group reservation based on the calculated materialization level.

In another embodiment, the present invention comprises a computer-readable code stored on media for conducting materialization forecasting with respect to group reservations made by a group coordinator for the potential purchase of perishable commodities, comprising: first subprocesses for gathering past reservation information relating to past group reservations for perishable commodities that have already perished, second subprocesses for gathering current reservation information relating to a current group reservation for perishable commodities that have not yet perished, third subprocesses for comparing the past reservation information and the current reservation information, fourth subprocesses for calculating the materialization level of the current group reservation based on the comparison, and fifth subprocesses for outputting a materialization forecast result for the current group reservation based on the calculated materialization level.

DETAILED DESCRIPTION OF THE PREFERRED EMBODIMENTS

In the following detailed description of the preferred embodiments, reference is made to the accompanying drawings which form a part hereof, and in which is shown by way of illustration, an embodiment in which the invention may be practiced. It is understood that other embodiments may be utilized, and changes may be made to both that process and the structure without departing from the scope of the present invention.

As used herein, the following terms have the following meanings:

Flight Leg—used in the context of airline travel to describe a single flight segment comprising a take-off from a departure point through the immediately-following landing at a destination point.

Itinerary—the sequential outline of a trip or other sequence of events, or a proposed trip or sequence of events. For example, in the context of airline travel, the term "Itinerary" describes the sequence of flight legs beginning at the originating (i.e., the first) departure point and ending at the ultimate (i.e., final) destination point. An airline travel itinerary can be "one-way" or "roundtrip" using the ordinary and customary meaning of these terms. An itinerary with respect to hotel travel would be the sequence of nightly hotel stays in a particular trip, beginning with the first stay and ending with the last.

Demographic Information—statistical characteristics of a population; in connection with the present invention, the demographic information pertains to statistical characteristics relating to group coordinators and consumers of perishable commodities including, without limitation, the age, gender, national origin, citizenship, country of residence, occupation, education, annual income, marital status, and frequency of purchase or reservation (of the perishable commodity).

Commodity Details—narrow, detailed information pertaining to a commodity; for example, commodity details in connection with an airline seat include, without limitation, carrier name, flight origin, flight destination, booking class, flight distance, departure time, connection time, arrival time, departure date, arrival date, flight duration, number of distinct legs comprising a complete one-way itinerary, aircraft type, aircraft capacity.

Point-of-Sale (POS) Information—statistical information available from the location where the sale of the commodity occurred. This information may include, without limitation, POS type (travel agent, direct sale, etc.), POS country, booking carrier, booking recency (e.g., number of days since booking made), change recency (e.g., number of days since bookings last changed), fare code, number of passengers traveling with the consumer making the reservations, length of stay associated with the reservation, time between booking date and flight date, payment status.

Materialization Level—with respect to a group booking comprising a plurality of individual reservations, a percentage or level indicative of the number of the individual reservations that actually materialize. For example, if a group booking consists of a reservation of 100 airline seats for a particular flight, and if on the perishing date 90 of the 100 reservations are actually purchased as part of the group booking, then the group booking would be considered as having a materialization level of 90%.

Materialization Information—statistical information identifying a reservation as having either materialized or not materialized.

Past Reservation Information—commodity details, demographic information, POS information and/or materialization information relating to past reservations for perishable commodities that have already perished. Upon expiration (perishing) of the commodity, the information pertaining thereto becomes past reservation information because it then relates to reservations that can no longer be filled.

Current Reservation Information—commodity details, demographic information, and/or POS information relating to current (i.e., pending) reservations for perishable commodities. Upon expiration (perishing) of the commodity, the current reservation information becomes past reservation information because it then relates to reservations that can no longer be filled.

Figure 1:
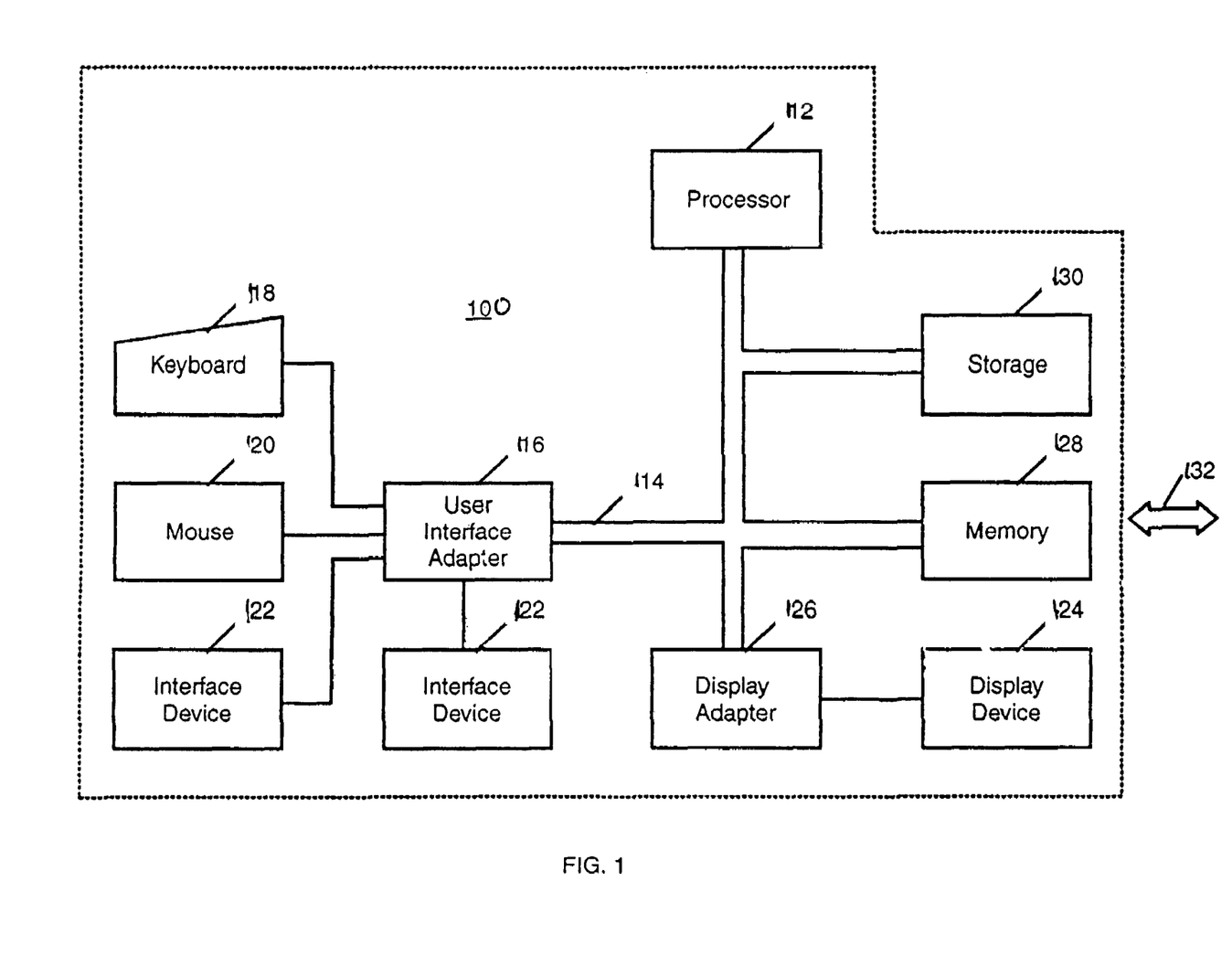
FIG. 1 illustrates a representative workstation hardware environment in which the present invention may be practiced.

FIG. 1 illustrates a representative workstation hardware environment in which the present invention may be practiced. The environment of FIG. 1 comprises a representative single user computer workstation 100, such as a personal computer, including related peripheral devices. The workstation 100 includes a microprocessor 112 and a bus 114 employed to connect and enable communication between the microprocessor 112 and the components of the workstation 100 in accordance with known techniques. The workstation 100 typically includes a user interface adapter 116, which connects the microprocessor 112 via the bus 114 to one or more interface devices, such as keyboard 118, mouse 120, and/or other interface devices 122, which can be any user interface device, such as a touch sensitive screen, digitized entry pad, etc. The bus 114 also connects a display device 124, such as an LCD screen or monitor, to the microprocessor 112 via a display adapter 126. The bus 114 also connects the microprocessor 112 to memory 128 and long term storage 130 which can include a hard drive, tape drive, etc.

The workstation 100 communicates via a communications channel 132 with other computers or networks of computers. The workstation 100 may be associated with such other computers in a local area network (LAN) or a wide area network, or the workstation 100 can be client in a client/server arrangement with another computer, etc. All of these configurations, as well as the appropriate communications hardware and software, are known in the art.

Figure 2:
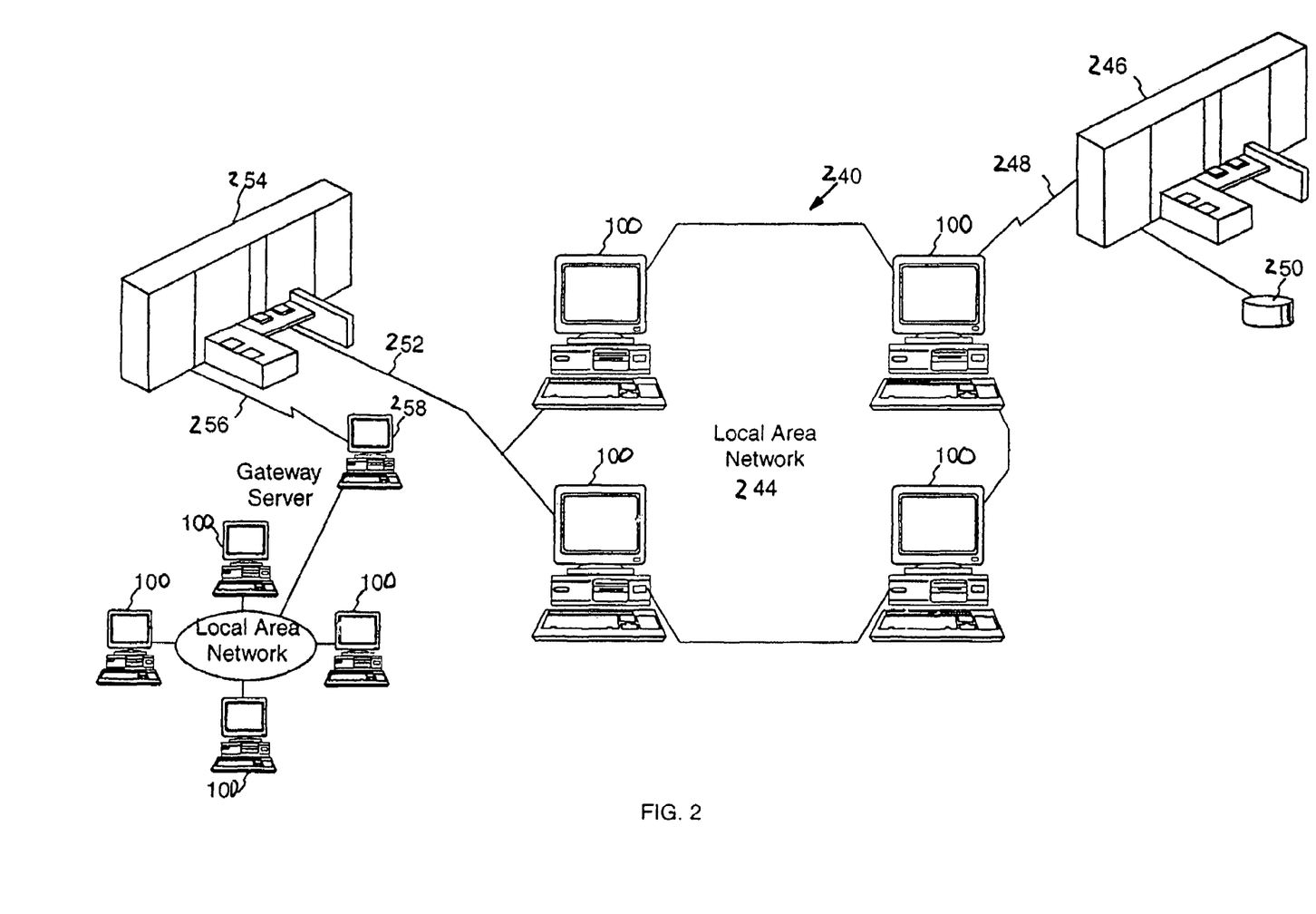
FIG. 2 illustrates a data processing network in which the present invention may be practiced.

FIG. 2 illustrates a data processing network 240 in which the present invention may be practiced. The data processing network 240 includes a plurality of individual networks, including LANs 242 and 244, each of which includes a plurality of individual workstations 100. Alternatively, as those skilled in the art will appreciate, a LAN may comprise a plurality of intelligent workstations coupled to a host processor.

Still referring to FIG. 2, the data processing network 240 may also include multiple mainframe computers, such as a mainframe computer 246, which may be preferably coupled to the LAN 244 by means of a communications link 248. The mainframe computer 246 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 246 may also be coupled to a storage device 250, which may serve as remote storage for the LAN 244. Similarly, the LAN 244 may be coupled to a communications link 252 through a subsystem control unit/communication controller 254 and a communications link 256 to a gateway server 258. The gateway server 258 is preferably an individual computer or intelligent workstation which serves to link the LAN 242 to the LAN 244.

Those skilled in the art will appreciate that the mainframe computer 246 may be located a great geographic distance from the LAN 244, and similarly, the LAN 244 may be located a substantial distance from the LAN 242. For example, the LAN 242 may be located in California, while the LAN 244 may be located in Texas, and the mainframe computer 246 may be located in New York.

Software programming code which embodies the present invention is typically stored in permanent storage of some type, such as the permanent storage 130 of the workstation 100. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

A preferred embodiment of the present invention will now be discussed with reference to FIGS. 3-4.

Figure 3:
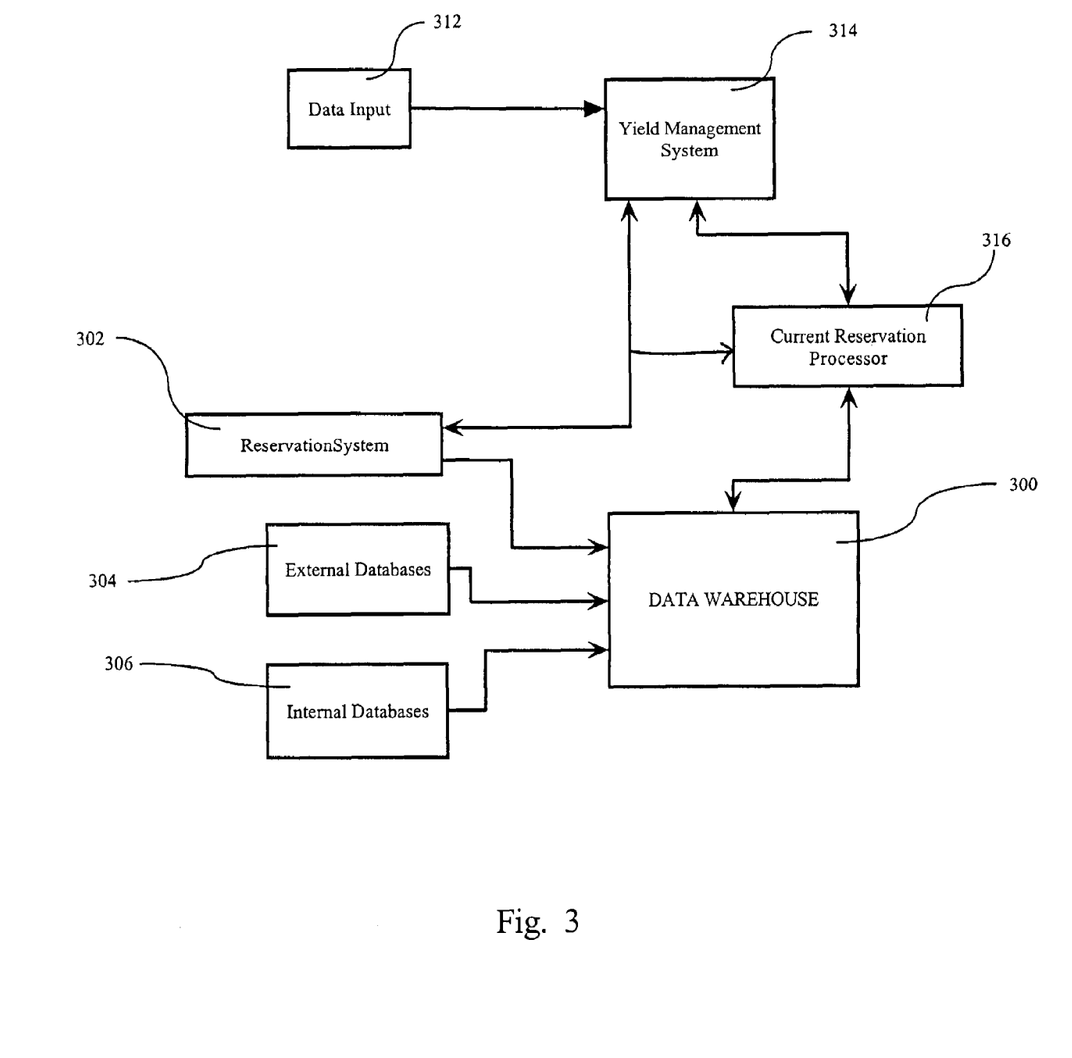
FIG. 3 is a block diagram of an exemplary embodiment of a system constructed in accordance with the present invention.

FIG. 3 is a block diagram of an exemplary embodiment of a system constructed in accordance with the present invention. As shown in FIG. 3, a data warehouse 300 stores reservation information, both past and current. The reservation information can be directed to data warehouse 300 from any known source, for example, from a reservation system 302 or from external or internal databases 304 and 306. External databases 304 and internal databases 306 are simply "reservoirs" of pertinent data which contain data of interest. Internal databases are kept by an organization for many purposes, e.g., frequent flyer information and marketing information might be kept in an internal database by an airline. External databases are maintained by private outside sources such as travel agents and data-gathering companies and typically the information they retain is sold to the using organization for profit, e.g., demographic information is often solicited by a private data-gathering organization in exchange for prizes or contest-entries, and the information obtained is then sold to an end user.

The type of data stored in the data warehouse is essentially limitless. Any information pertaining to the commodity can be made available for analysis; for example, with respect to airline seats, the information can include: booking class (first class, economy, business), revenue class of the booking (e.g., restricted fare, 14-day refund restriction, etc.), number of days since booking was made, number of days since last booking change, number of passengers involved in the booking, name change in booking (.e.g., from last name only for all bookings to specific names for each booking), special booking features (e.g., booking for displaced crew; booking for courier flight), booking office location, identification of booking as a series booking or an ad hoc booking, country of booking, number of legs in booking, proportion of adults to total number in booking, proportion children to total number in booking, details regarding special requests (e.g., kosher meals, wheelchair requests) and the like.

Any of this information may be considered in determining the likelihood of materialization for a reservation request.

The data warehouse 300 may be updated on a real time basis, i.e., as new reservations are made, data regarding the new reservation is immediately stored in the data warehouse 300 so it is immediately available for use in analysis and/or modeling. The new reservation information (e.g., information identifying the group coordinator making the reservation(s), passenger information, flight information, etc. related to a reservation currently being made) is first input to a conventional yield management system 314 via data input device 312. Data input device 312 can comprise, for example, a keyboard or a server which receives data input from other sources such as the internet, an intranet, or other input source. The yield management system operates in connection with the reservation system 302 in a known manner to confirm (or deny) a reservation request after a determination is made that reservation spaces are (or are not) available taking into account the overbooking criteria established by the yield management system.

Connected between data warehouse 300 and yield management system 314 is a current reservation processor 316 which is capable of two-way communication with data warehouse 300, reservation system 302, and yield management system 314. In accordance with the present invention, the data warehouse 300 is queried by current reservation processor 316 to find past group reservation information having similar characteristics to the current group reservation information. Thus, in contrast to the prior art systems, which simply compares the past booking history of, e.g., group coordinator David S. of Timster Tours, the present invention examines all reservations, group or otherwise, and locates those which have similar characteristics to those of the current group reservation, not only those made by David S. of Timster Tours.

As an example, assume that the group reservations made by David S. over the past two years have an average materialization level of 60%. Assume further that the current group reservation request from David S. being processed by current reservation processor 316 is for a group of 150 people for a non-stop, Philadelphia-to-London flight; the purpose of the trip is for a corporate business retreat; the group reservation is being made 9 months before the perishing date of the flight; a 50% non-refundable down payment is being made to hold the reservations; and the group reservation is being made by direct contact between the group coordinator and the airline. Using the present invention, the data warehouse 300 is can search for all previous reservations having the same attributes, and the materialization level for all past reservations that have the same attributes is evaluated. The past reservations that are analyzed may be individual bookings having characteristics similar to the bookings of the current group reservation request, or the analysis can be limited to past group bookings having similar characteristics. Based on this information, if it is determined that reservations having these attributes have a 98% materialization rate, this factor is applied to the current reservation, using the yield management system 314 in a well-known manner.

Using the prior art method which would look only at the past overall performance of David S., the airline would assume that only 60%, or 72 of the 150 reservations, would actually materialize, and the yield management system 314 would 4 allow overbooking of the flight accordingly. Using the present invention, however, the airline would assume that for this particular group booking by David S., 98%, or 147 of the 150 reservations, would actually materialize, and the overbooking for this particular flight would be considerably less than if the prior art methods were used.

Figure 4:
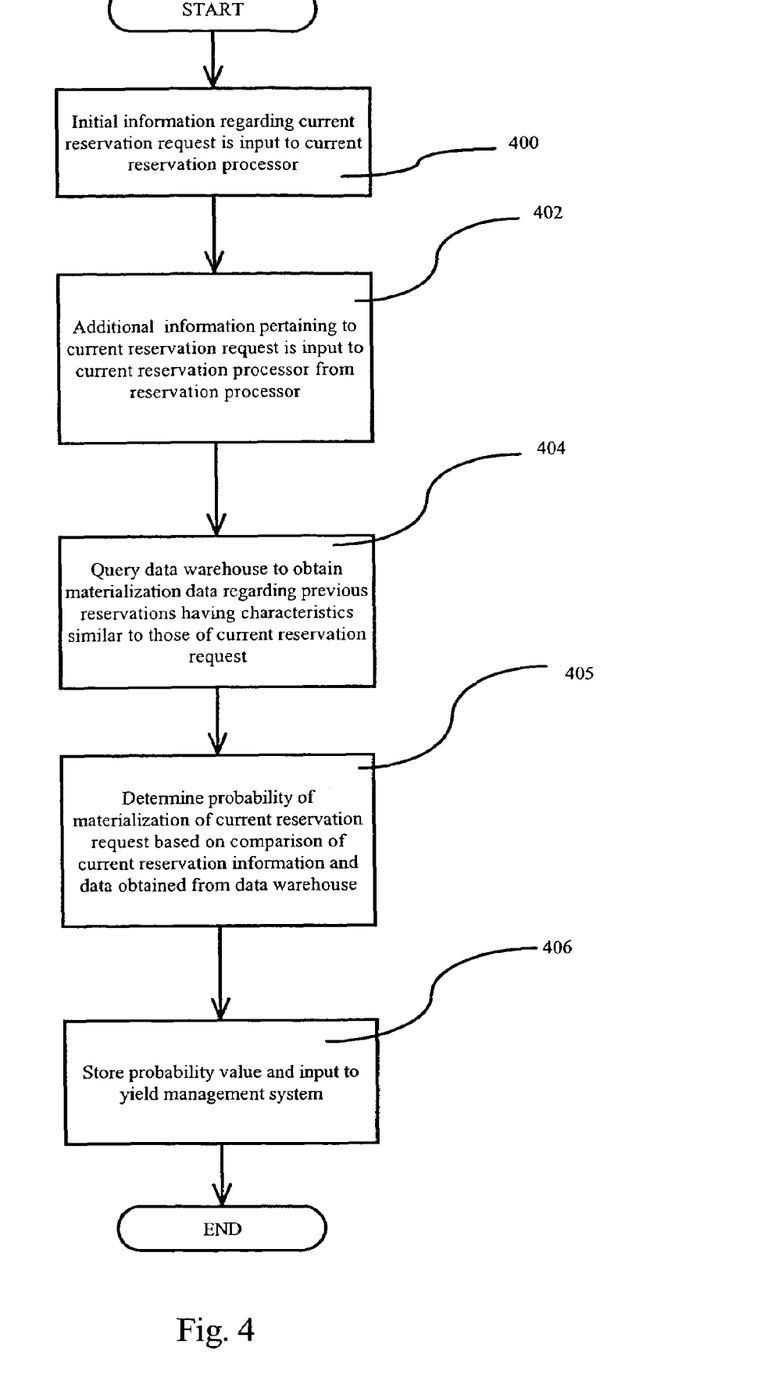
FIG. 4 is a flowchart illustrating the steps of the method of the present invention.

FIG. 4 is a flowchart illustrating the basis steps of the method of the present invention. At step 400 information regarding a current group reservation request is input to the current reservation processor 316 via the yield management system 314. The information regarding the current group reservation request will include the basic information given by a group coordinator, including, without limitation: the identity of the group coordinator; travel date(s) and time(s); number of passengers in the group; age categories of passengers (e.g., under 12, senior citizen, etc.); gender of passengers; departure and destination location(s); type of travel (e.g., business); and payment details. Based on this information, the reservation system 302 also supplies additional information to current reservation processor 316 at step 402. This information is derived based upon the current group reservation information discussed above. For example, based on the input information by the group coordinator, the reservation system might indicate to current reservation processor 316 that Flight 250 from Philadelphia to London will satisfy the travel dates, times, number of passengers in the group, departure and destination locations, etc. requested by the group coordinator.

At block 404, the current reservation processor queries the data warehouse 300 to obtain materialization data regarding previous reservations made which possess data characteristics similar to those of the current group reservation request. At block 404, based upon the comparison of the past materialization data from the data warehouse 300 and the current group reservation information input at step 400, the probability of materialization (i.e., the materialization level) for the current reservation request is determined and stored in the current transaction processor 316. Finally, at step 406, the stored information regarding the materialization level of the current group reservation request is input to the yield management system 314, which utilizes this information to authorize or deny the reservation of group reservation requested by the group coordinator.

Use of the present invention results in much greater precision in materialization forecasting than the methods and systems of the prior art. By focusing on and analyzing the individual details of all group reservations and determining attributes of a group reservation which indicate the materialization level of the group reservation, the accuracy of materialization forecasting is improved and the efficiency of running operations, such as airlines, is increased significantly.

While the present invention can be used at any time and as often or as little as desired, additional benefits can be obtained by utilizing the invention at certain critical times in a reservation cycle prior to the perishing date. For example, in connection with airline reservations, it can be helpful to increase the frequency of updating the materialization information as the departure time gets closer, e.g., at departure plus 21 days, departure plus 14 days, departure plus 7 days, departure plus 4 days, etc. Having this updated information would allow the airline to make adjustments as needed, such as by discounting fares to make sure reservations that became unmaterialized at the last minute can be sold or by adding additional flights to a schedule if warranted. Further, by obtaining updated materialization information at departure plus 2 days or on the day of departure, a clearer picture of the cash flow position for a departing flight can be gained (since reservations that are still valid at that late date are very likely to materialize and thus the airline can be relatively sure that the cash generated by the flight will become a receivable).

Although the present invention has been described with respect to a specific preferred embodiment thereof, various changes and modifications may be suggested to one skilled in the art and it is intended that the present invention encompass such changes and modifications as fall within the scope of the appended claims. For instance, the example described above is directed primarily to an airline reservations system; however, it is understood that the present invention has equal application and the claims herein are intended to cover to any reservation system involving transactions related to perishable commodities. Further, while certain examples of characteristics and traits of the reservations and perishable commodities are given herein, it is not intended to limit the present invention to the gathering and analysis of these characteristics and traits; any characteristics and traits of the perishable commodities may be utilized in connection with the present invention. The programming of the present invention may be implemented by one of ordinary skill in the art of object-oriented programming.

The above-described materialization prediction system and its individually described elements may be implemented in various computing environments. For example, the present invention may be implemented on a conventional IBM PC or equivalent, multi-nodal system (e.g., LAN) or networking system. All programming, algorithms, GUIs, display panels and dialog box templates, metadata and data related thereto are stored in computer memory, static or dynamic, and may be retrieved by the user in any of: conventional computer storage, display (i.e., CRT) and/or hardcopy (i.e., printed) formats.

I claim:

1. A method, using a processing device, for materialization forecasting with respect to group reservations made by a group coordinator for the potential purchase of a particular perishable commodity, comprising the steps of:
    gathering past system-wide reservation information relating to past group reservations for perishable commodities that have already perished, said system-wide reservation information including information unrelated to said particular perishable commodity;
    gathering current reservation information relating to a current group reservation for said particular perishable commodity, which current group reservation has not yet perished;
    comparing said gathered past reservation information unrelated to said particular perishable commodities and said current reservation information, using said processing device;
    calculating, using said processing device, the materialization level of said current group reservation based on said comparison; and
    outputting a materialization forecast result for said current group reservation based on said calculated materialization level.

2. The method as set forth in claim 1, wherein said past reservation information includes historical commodity details unrelated to said particular perishable commodity.

3. The method as set forth in claim 2, wherein said past reservation information further includes Point-of-Sale (POS) information included in said past system-wide reservation information that is unrealted to said potential purchase of said particular perishable commodity.

4. The method as set forth in claim 3, wherein said past reservation information further includes materialization information unrelated to said potential purchase of said particular perishable commodity.

5. The method as set forth in claim 4, wherein said past reservation information includes demographic information about group coordinators who made said past group reservations.

6. The method as set forth in claim 5, wherein said demographic information includes one or more of the following pertaining to said group coordinators who made said past group reservations: age, sex, national origin, citizenship, country of residence, occupation, employer, annual income, education.

7. The method as set forth in claim 6, wherein said current group reservation information further includes commodity details regarding said particular perishable commodity.

8. The method as set forth in claim 7, wherein said current group reservation information further includes POS information pertaining to said particular perishable commodity.

9. The method as set forth in claim 8, wherein said current reservation information includes demographic information about a group coordinator making said current reservation for said particular perishable commodity.

10. The method as set forth in claim 9, wherein said demographic information includes one or more of the following pertaining to said group coordinator making said current group reservation: age, sex, national origin, citizenship, country of residence, occupation, employer, annual income, education.

11. The method as set forth in claim 10, wherein said perishable commodities comprise airline seats, and wherein said historical commodity details include information related to one or more of the following with respect to said airline seats: carrier name, flight origin, flight destination, booking class, flight distance, departure time, connection time, arrival time, departure date, arrival date, flight duration, number of distinct legs comprising a complete one-way itinerary, aircraft type, aircraft capacity.

12. The method as set forth in claim 11, wherein said POS information includes one or more of the following: POS type, POS country, booking carrier, booking recency, change recency, fare code, number of passengers in said past group reservations, length of stay associated with the reservation, time between booking date and flight date, payment status.

13. The method as set forth in claim 12, wherein said commodity details regarding said current group reservation include information related to one or more of the following: carrier name, flight origin, flight destination, booking class, flight distance, departure time, connection time, arrival time, departure date, arrival date, flight duration, number of distinct legs comprising a complete one-way itinerary, aircraft type, aircraft capacity.

14. Computer-readable code embodied on computer-readable media for conducting materialization forecasting with respect to group reservations made by a group coordinator for the potential purchase of a particular perishable commodity, comprising:

first subprocesses for gathering past system-wide reservation information relating to past group reservations for perishable commodities that have already perished, said past system-wide reservation information including information unrelated to said particular perishable commodity;

second subprocesses for gathering current reservation information relating to a current group reservation for said particular perishable commodity, which current reservation information has not yet perished;

third subprocesses for comparing said gathered past reservation information unrelated to said particular perishable commodity and said current reservation information;

fourth subprocesses for calculating the materialization level of said current group reservation based on said comparison; and fifth subprocesses for outputting a materialization forecast result for said current group reservation based on said calculated materialization level.

15. The computer-readable code as set forth in claim 14, wherein said past reservation information includes historical commodity details unrelated to said particular perishable commodity.

16. The computer-readable code as set forth in claim 15, wherein said past reservation information further includes Point-of-Sale (POS) information included in said past system-wide reservation that is unrelated to said potential purchase of said particular perishable commodity.

17. The computer-readable code as set forth in claim 16, wherein said past reservation information further includes materialization information unrelated to said potential purchase of said particular perishable commodity.

18. The computer-readable code as set forth in claim 17, wherein said past reservation information includes demographic information about group coordinators who made said past group reservations.

19. The computer-readable code as set forth in claim 18, wherein said demographic information includes one or more of the following pertaining to said group coordinators who made said past group reservations: age, sex, national origin, citizenship, country of residence, occupation, employer, annual income, education.

20. The computer-readable code as set forth in claim 19, wherein said current group reservation information further includes commodity details regarding said particular perishable commodity.

21. The computer-readable code as set forth in claim 20, wherein said current group reservation information further includes POS information pertaining to said particular perishable commodity.

22. The computer-readable code as set forth in claim 21, wherein said current reservation information includes demographic information about a group coordinator making said current reservation for said particular perishable commodity.

23. The computer-readable code as set forth in claim 22, wherein said demographic information includes one or more of the following pertaining to said group coordinator making said current group reservation: age, sex, national origin, citizenship, country of residence, occupation, employer, annual income, education.

24. The computer-readable code as set forth in claim 23, wherein said perishable commodities comprise airline seats, and wherein said historical commodity details include information related to one or more of the following with respect to said airline seats: carrier name, flight origin, flight destination, booking class, flight distance, departure time, connection time, arrival time, departure date, arrival date, flight duration, number of distinct legs comprising a complete one-way itinerary, aircraft type, aircraft capacity.

25. The computer-readable code as set forth in claim 24, wherein said POS information includes one or more of the following: POS type, POS country, booking carrier, booking recency, change recency, fare code, number of passengers in said past group reservations, length of stay associated with the reservation, time between booking date and flight date, payment status.

26. The computer-readable code as set forth in claim 25, wherein said commodity details regarding said current group reservation include information related to one or more of the following: carrier name, flight origin, flight destination, booking class, flight distance, departure time, connection time, arrival time, departure date, arrival date, flight duration, number of distinct legs comprising a complete one-way itinerary, aircraft type, aircraft capacity.

* * * * *

UNITED STATES PATENT AND TRADEMARK OFFICE
CERTIFICATE OF CORRECTION

| | | |
|---|---|---|
| PATENT NO. | : 7,533,032 B1 | Page 1 of 1 |
| APPLICATION NO. | : 09/628398 | |
| DATED | : May 12, 2009 | |
| INVENTOR(S) | : David A. Selby | |

It is certified that error appears in the above-identified patent and that said Letters Patent is hereby corrected as shown below:

Title Page, (45) Please add an (*) before May 12, 2009

(*) Please add: This patent is subject to a terminal disclaimer.

Signed and Sealed this
Eighth Day of May, 2012

David J. Kappos
*Director of the United States Patent and Trademark Office*